(12) United States Patent
Sattler et al.

(10) Patent No.: US 11,592,080 B2
(45) Date of Patent: Feb. 28, 2023

(54) BEARING, TRACTION OR DRIVE ELEMENT MADE OF AN ELASTOMER MATERIAL HAVING EMBEDDED ELECTRONIC COMPONENTS

(71) Applicant: ContiTech Antriebssysteme GmbH, Hannover (DE)

(72) Inventors: Heiko Sattler, Wedemark (DE); Svenja Rosenbohm, Hannover (DE); Claus-Lueder Mahnken, Ahausen (DE); Siegfried Reck, Nienburg/Weser (DE); Simon Rosen, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 616 days.

(21) Appl. No.: 16/608,293

(22) PCT Filed: Feb. 5, 2018

(86) PCT No.: PCT/EP2018/052728
§ 371 (c)(1),
(2) Date: Oct. 25, 2019

(87) PCT Pub. No.: WO2018/197061
PCT Pub. Date: Nov. 1, 2018

(65) Prior Publication Data
US 2021/0102602 A1    Apr. 8, 2021

(30) Foreign Application Priority Data

Apr. 26, 2017    (DE) .................... 10 2017 206 980.5

(51) Int. Cl.
*F16G 5/20*  (2006.01)
*B29C 43/18*  (2006.01)
(Continued)

(52) U.S. Cl.
CPC .............. *F16G 5/20* (2013.01); *B29C 43/18* (2013.01); *B29D 29/08* (2013.01); *F16G 5/06* (2013.01);
(Continued)

(58) Field of Classification Search
CPC ..... F16G 1/28; F16G 5/20; F16G 5/06; B65G 2203/042; B65G 43/02; B29C 43/18; B29D 29/08; B29K 2105/106; B29L 2031/7094
(Continued)

(56) References Cited

U.S. PATENT DOCUMENTS 3,651,506 A * 3/1972 Olaf ...................... B65G 43/02
324/67
3,731,113 A * 5/1973 Lowe .................... B65G 43/02
340/676
(Continued)

FOREIGN PATENT DOCUMENTS

DE         19801253 A1    7/1999
DE    102009003732 A1   10/2010
(Continued)

OTHER PUBLICATIONS

International Search Report dated on Jun. 4, 2018 of International Application PCT/EP2018/052728 on which this application is based.

*Primary Examiner* — Henry Y Liu

(57) ABSTRACT

A band or belt designed as an elongate bearing, traction or drive element running around rollers or pulleys and made of an elastomer material, and preferably provided with embedded reinforcing elements or tension members extending in the longitudinal direction of the band or belt, having the following features:
the band or the belt has one or more elongate tubular receptacles embedded in the elastomer material, in the cavity of which electronic components are arranged,
(Continued)

Figure 1:
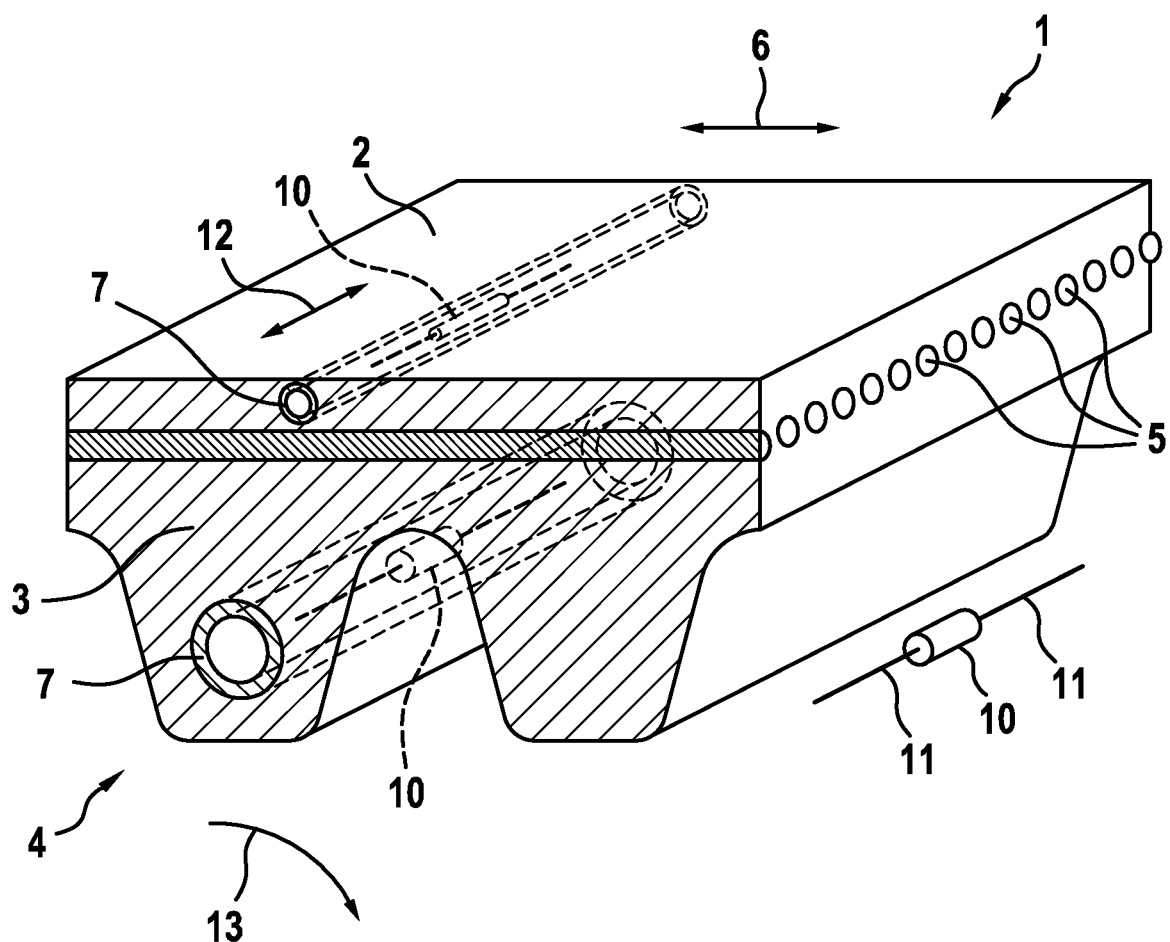

preferably sensors, signal processing or control devices and/or transmission devices, the tubular receptacles are embedded in the elastomer material in such a way that their longitudinal axis or the direction of their greatest extent is oriented substantially transversely to the main bending direction of the band or belt.

13 Claims, 4 Drawing Sheets

(51) Int. Cl.
*B29D 29/08* (2006.01)
*F16G 5/06* (2006.01)
*B29K 105/10* (2006.01)
*B29L 31/00* (2006.01)

(52) U.S. Cl.
CPC . *B29K 2105/106* (2013.01); *B29L 2031/7094* (2013.01)

(58) Field of Classification Search
USPC .................................. 474/202, 205, 204
See application file for complete search history.

(56) References Cited

U.S. PATENT DOCUMENTS

| | | | | |
|---|---|---|---|---|
| 3,731,786 A * | 5/1973 | Nagata | ................... | B65G 43/02 198/810.02 |
| 3,742,477 A * | 6/1973 | Enabnit | ................... | B65G 43/02 340/676 |
| 3,750,129 A * | 7/1973 | Takeno | ................... | G01N 27/82 198/810.02 |
| 4,621,727 A * | 11/1986 | Strader | ................... | B65G 43/02 340/676 |
| 4,854,446 A * | 8/1989 | Strader | ................... | B65G 43/02 340/676 |
| 5,168,266 A * | 12/1992 | Fukuda | ................... | B65G 43/02 324/67 |
| 5,292,388 A * | 3/1994 | Candore | ................... | H05K 3/281 198/956 |
| 5,426,362 A * | 6/1995 | Ninnis | ................... | G01N 27/82 340/676 |
| 6,047,814 A * | 4/2000 | Alles | ................... | B65G 43/02 198/810.02 |
| 6,264,577 B1 * | 7/2001 | Hutchins | ................ | B60C 23/0493 198/810.02 |
| 6,715,602 B1 * | 4/2004 | Gartland | ................... | B65G 43/02 340/676 |
| 7,494,004 B2 * | 2/2009 | Stolyar | ................... | B65G 43/02 198/810.04 |
| 8,312,987 B2 * | 11/2012 | Lynn | ................... | G01M 13/023 474/263 |
| 2002/0145529 A1 * | 10/2002 | Kuzik | ................... | B65G 43/02 340/657 |
| 2004/0149049 A1 * | 8/2004 | Kuzik | ................... | B65G 43/02 73/862.453 |
| 2004/0262132 A1 * | 12/2004 | Pauley | ................... | B65G 43/02 198/810.02 |
| 2006/0114452 A1 * | 6/2006 | Schnell | ................... | B65G 43/02 356/237.1 |
| 2008/0006513 A1 * | 1/2008 | Stolyar | ................... | B65G 43/02 198/810.01 |
| 2008/0257692 A1 * | 10/2008 | Wallace | ................... | B65G 43/02 198/810.02 |
| 2009/0101482 A1 * | 4/2009 | Kusel | ................... | B65G 43/02 198/810.01 |
| 2011/0285388 A1 * | 11/2011 | Tomioka | ................ | B29D 29/10 156/137 |
| 2012/0012443 A1 * | 1/2012 | Sakaguchi | ............. | B65G 43/02 198/824 |
| 2012/0323371 A1 * | 12/2012 | Ballhausen | ............. | F16G 1/28 700/275 |
| 2013/0221761 A1 * | 8/2013 | DePaso | ............... | B29C 45/0001 307/151 |
| 2014/0131176 A1 * | 5/2014 | Minkin | ................... | B65G 43/02 198/810.02 |
| 2015/0285335 A1 * | 10/2015 | Mitsutomi | ................ | F16G 5/06 156/137 |
| 2017/0254405 A1 * | 9/2017 | Ballhausen | ............. | F16G 1/10 |
| 2018/0313707 A1 * | 11/2018 | Schumacher | ........... | B65G 11/20 |
| 2020/0346874 A1 * | 11/2020 | Onishi | ................... | B66B 29/00 |

FOREIGN PATENT DOCUMENTS

| | | |
|---|---|---|
| DE | 102010002551 A1 | 9/2011 |
| JP | 2009007078 A | 1/2009 |

* cited by examiner

BEARING, TRACTION OR DRIVE ELEMENT MADE OF AN ELASTOMER MATERIAL HAVING EMBEDDED ELECTRONIC COMPONENTS

The invention relates to a band or belt designed as an elongate bearing, traction or drive element running around rollers or pulleys and made of an elastomer material, and preferably provided with embedded reinforcing elements or tension members extending in the longitudinal direction of the band or belt. A production method for drive belts designed in this way is likewise claimed.

The use of such bands or belts, e.g. as elastomer belts in capital-intensive agricultural machines or fixed industrial plants, requires careful preventative maintenance. For this purpose, such drive belts are currently changed early by way of prevention in order to avoid damage to the machines or plants and thus to avoid expensive downtimes.

In this context, the changing of such belts is carried out on the basis of empirical values and many years of records subject to different load populations. Effective monitoring during operation is virtually impossible.

It would therefore be desirable to provide such belts with monitoring systems, e.g. with electronic components, which can transmit measured values of belts to the outside during operation and thus allow condition-dependent maintenance. However, it has not hitherto been possible to integrate electronic components permanently into such bands or belts in such a way that they are capable of functioning.

On the one hand, this is due to the fact that such drive belts, as elastomer components, are vulcanized at about 200° C. At such a temperature, the ability to function of electronic components is threatened by the vulcanization if—as is customary—such electronic components are introduced before vulcanization.

Moreover, the conventional production of, for example, endless belts in loops on belt building drums entails the risk that it will not be possible to accurately locate the electronics during the subsequent isolation of a loop or drive belt and that they may be destroyed by the cuts required for isolation. This is the case especially if flow processes during vulcanization change a previously marked position of an electronic component.

Finally, an electronic component is subject to expansions and compressions in the belt body during the revolution of a belt in operation, and this severely reduces the durability of the electronic components—irrespective of the point in time at which they are introduced.

It was therefore the object of the invention to provide a band or a belt with which it is possible for an operation-dependent state of wear to be monitored with the aid of electronic components. It was furthermore the object of the invention to indicate a design and a production method by means of which reliable and accurately positioned installation of electronic components becomes possible without the electronic component being destroyed already during vulcanization or being subject to excessive stress during operation due to stresses in the band or belt.

This object is achieved by the features of the main claim. Further advantageous configurations are disclosed in the subclaims.

Here, the band according to the invention or belt according to the invention is characterized by the following features:
 the band or the belt has one or more elongate tubular receptacles embedded in the elastomer material, in the cavity of which electronic components are arranged, preferably sensors, signal processing or control devices and/or transmission devices,
 the tubular receptacles are embedded in the elastomer material in such a way that their longitudinal axis or the direction of their greatest extent is oriented substantially transversely to the main bending direction of the band or belt, i.e. substantially parallel to the roller or pulley axis of a roller or pulley around which the respective band or belt is currently running.

Such an embodiment according to the invention of protective receptacles for the electronic components and the alignment thereof transversely to the main bending direction offers excellent protection for the electronic components located in the hollow bodies during operation and during production by means of vulcanization. At the same time, the position of the elongate tubular receptacles/hollow bodies does not prejudice the operational strength of the band or belt. Such receptacles, the maximum extent of which is transverse to the subsequent main bending direction of a belt, give rise, as round bodies to the minimum possible notch effect in the belt body. After vulcanization and isolation of a loop and optionally after the production of a flank angle, the electronic components are introduced into the tubular hollow bodies, positioned there and connected.

An advantageous development for this consists in that the electronic components are surrounded and fixed within the cavity by a curing compound, preferably a curing synthetic casting resin. This allows particularly simple introduction of the electronic components while simultaneously ensuring fixing in place.

Another advantageous embodiment consists in that the electronic components are surrounded within the cavity by shock absorbing material, and the tubular receptacle is provided at the end/s with a closure or plug. Such an embodiment reduces the loading of the electronic components, especially in the case of sudden bending loads, which arise, for example, when a drive belt designed as a toothed belt runs suddenly into a toothed belt pulley.

Another advantageous embodiment consists in that the electronic components are surrounded within the cavity by thermally conductive material (thermally conductive paste), and the tubular receptacle is provided at the end/s with a closure or plug. By means of such an embodiment, heat which develops within the receptacle during the operation of the electronic components can be dissipated in a simple manner.

Another advantageous embodiment consists in that the tubular receptacle is a plastic tube or small tube, preferably made of polyamide (PA) or polyphenylene sulfide (PPS). The latter has a melting point of about 285° and is thus ideally suited to surviving without damage the temperatures of up to 200° which occur during vulcanization.

Another advantageous embodiment consists in that the tubular receptacle is connected to a longitudinal side of the band or belt and the cavity is accessible from there. This facilitates the introduction of the electronic components after the production of the individual belts, e.g. after the production of a drive belt.

In addition to use for e.g., conveyor belts, transfer belts or elevator belts, the embodiment according to the invention of a band or belt is particularly suitable for use as a drive belt, in this case preferably a toothed belt or wide V-belt. The geometry of such belts makes it possible, especially in conjunction with the likewise claimed production method according to the invention, to ensure a reliable position of the electronic components, e.g. in the tooth root region of a toothed belt, which is relatively uncritical in respect of the installation dimensions or the available installation space.

As regards the production method according to the invention, a conventional molding method for a drive belt, of the kind known in the prior art, will first of all be described.

In the case of a known molding method, the profile of the blank is produced during the vulcanization process, specifically by means of a cylindrical vulcanization mold which, on its inner side, has the negative of the profile, e.g. of a toothed profile or ribbed profile, into which the blank is pressed before or during the vulcanization.

After their production and vulcanization, the belts therefore initially have the profile on their outer side. After the individual rings have been cut off from the loop, the rings are "turned inside out", such that their profiled side lies on the inner side. One thus obtains the commonly known drive belt, which, by means of its profiled inner side, drives complementarily designed belt pulleys, and to the back side of which tensioning rollers or further drives are possibly connected in force-fitting fashion.

In the case of a commonly used molding method, the blank is built up on a so-called belt building drum. With regard to the further manufacturing process and the subsequent "turning inside out", it is self-evidently firstly necessary for the back side of the belt, specifically the so-called top ply, to be built up on said drum. The latter may be built up in one or two layers and provided with various additives or coatings.

The so-called "tension strand" composed of one or more strengthening members is then applied to said top ply. The strengthening members are normally composed of one or more fibers, filaments or cords folded or twisted around one another, and are wound in one or more layers, in windings of greater or lesser tightness, over the entire width of the belt building drum. In the finished belt, the strengthening members are crucial for the transmission of tensile force and are then situated in the regions between the top ply and the base of the belt.

After the top ply (plies) and the tension strand have been applied, the so-called "base" or main body of the drive belt, that is to say the region which later has the profile and possibly also a small further layer thickness, is applied to the tension strand. Here, the base is applied, for example, in the form of a thin plate composed of elastomer material/rubber, the width of which corresponds to the length of the belt building drum, and the length of which approximately corresponds to the circumference of the belt building drum. The ends of said plate can be easily joined together when in the still-tacky state.

Finally, a fabric ply is often also applied, which provides special characteristics for the finished V-ribbed belt in the profile region, for example contributes to noise or friction reduction. The fabric ply thus completes the V-ribbed blank.

The thus produced drive belt blank, namely the non-vulcanized assembly composed of top ply, tension strand and base and possibly fabric ply is then inserted in such a way into the cylindrical vulcanization mold, which is of slightly greater diameter, that the base or the fabric ply faces toward the inner side, provided with a negative of the profile, of the vulcanization mold.

After this, the drive belt blank is heated and pressed into the surrounding negative of the vulcanization mold in such a way that the base is forced into the negative and provided with the drive belt profile.

This can be performed in such a way, for example, that the belt building drum is removed and a sleeve, usually composed of rubber, and corresponding devices for expanding the sleeve and for heating it are introduced into the inner cavity of the vulcanization mold and of the blank, usually in order to supply the sleeve with compressed air and with superheated steam.

The sleeve is then expanded by means of the superheated steam, bears against the top ply and presses the entire blank into the surrounding negative of the vulcanization mold, whereby the outer layer of the blank, specifically the base or the fabric ply, is pressed into the negative and is thus provided with a "molded" profile.

In a kinematic reversal, the molding of the profile and the vulcanization can also be performed in such a way that the surrounding vulcanization mold provided with the profile negative is fed as a heating sleeve from the outside onto the blank still situated on the belt building drum, and the blank is thereby molded and fully vulcanized to give the finished loop.

The method according to the invention for producing the bands or belts in the form of a drive belt provided with electronic components takes as its starting point these known molding methods, in which the drive belt blank and the surrounding negative of the vulcanization mold are pressed together in such a way that the base is pressed into the negative and is provided with the drive belt profile, and solves the problem of indicating a production method by means of which reliable and accurately positioned installation of electronic components becomes possible without the electronic components being destroyed already during vulcanization or being subject to excessive stress during operation due to stresses in the band or belt.

According to the invention, elongate tubular hollow bodies, preferably small tubes made of polyamide (PA) or polyphenylene sulfide (PPS), which are especially suitable for withstanding the high vulcanization temperatures without problems, are introduced between the individual plies or layers of the top plies or of the base over the circumference of the blank during the building up of the blank on the belt building drum.

In this case, the longitudinal axes of the elongate tubular hollow bodies or the direction of their greatest extent is oriented substantially parallel to the axis of the building drum, wherein the hollow bodies are then vulcanized to the entire assembly and incorporated in the elastomer matrix.

After vulcanization, individual rings are cut off from the V-ribbed blank and turned inside out to form individual drive belts, as was also already customary.

In this way, the previously known method is modified in such a way with a few additional method steps that the elongate tubular hollow bodies can be introduced as simple small tubes without major effort during the building process and are vulcanized at the same time into the overall loop.

An advantageous development of the method consists in that an elongate tubular hollow body or a plurality of hollow bodies situated one behind the other with a clearance is introduced at a respective circumferential position over the length of the blank on the belt building drum. In this way, the hollow bodies/small tubes are introduced "in segments" and can be laid on the building drum in respect of their longitudinal position in such a way that the hollow bodies are located at the envisaged positions during the subsequent cutting of the individual drive belts, e.g. corresponding to the respective outer side faces of a wide belt and being accessible from there, in order to introduce the electronic components.

Another advantageous embodiment consists in that wires or tension means, which are removed after vulcanization, are passed through the hollow body to fix the hollow body at a circumferential position. Of course, this facilitates the accurate positioning of the hollow bodies or small tubes during production and avoids the hollow bodies being displaced in the elastomer owing to flow processes during vulcanization.

Figure 2:
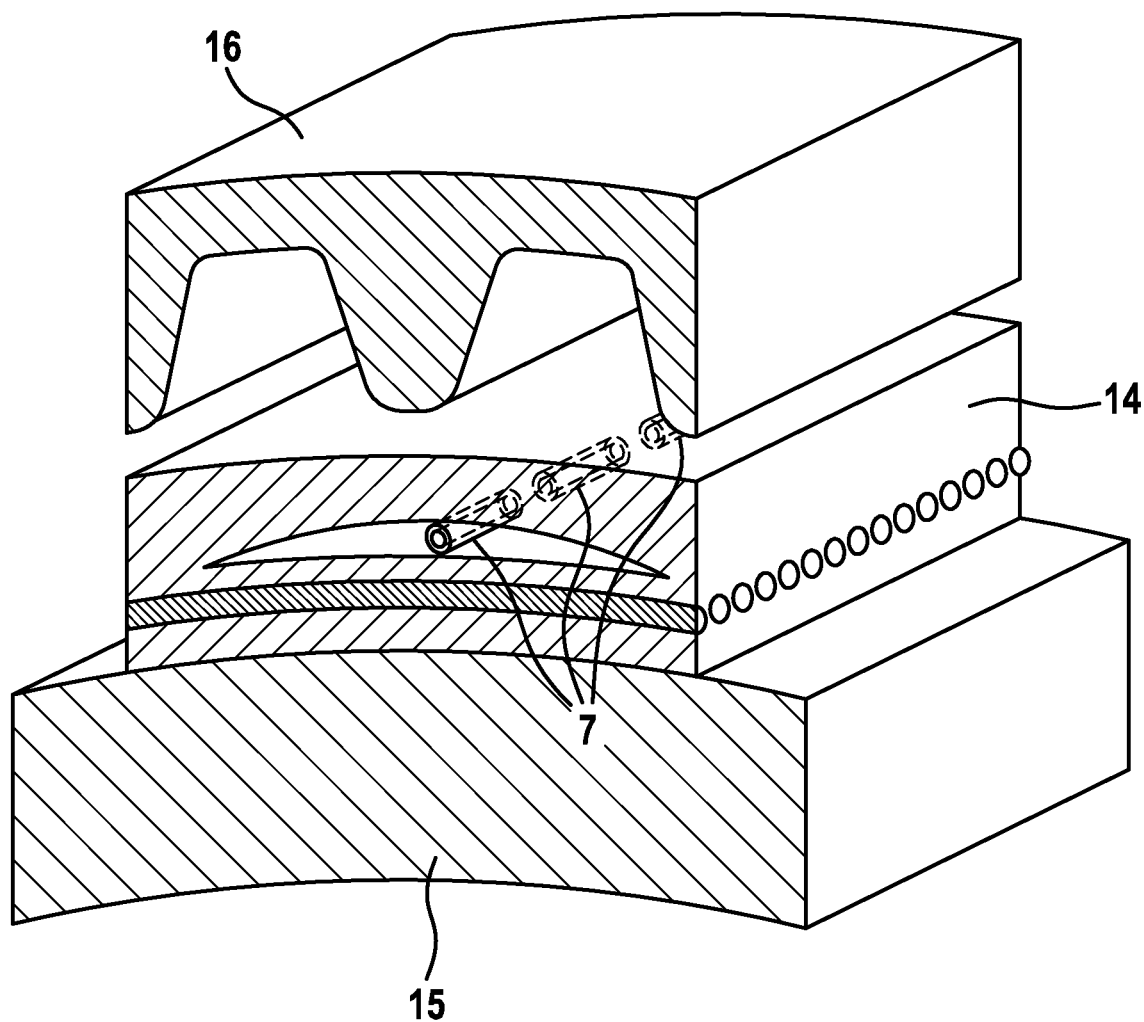
Figure 3:
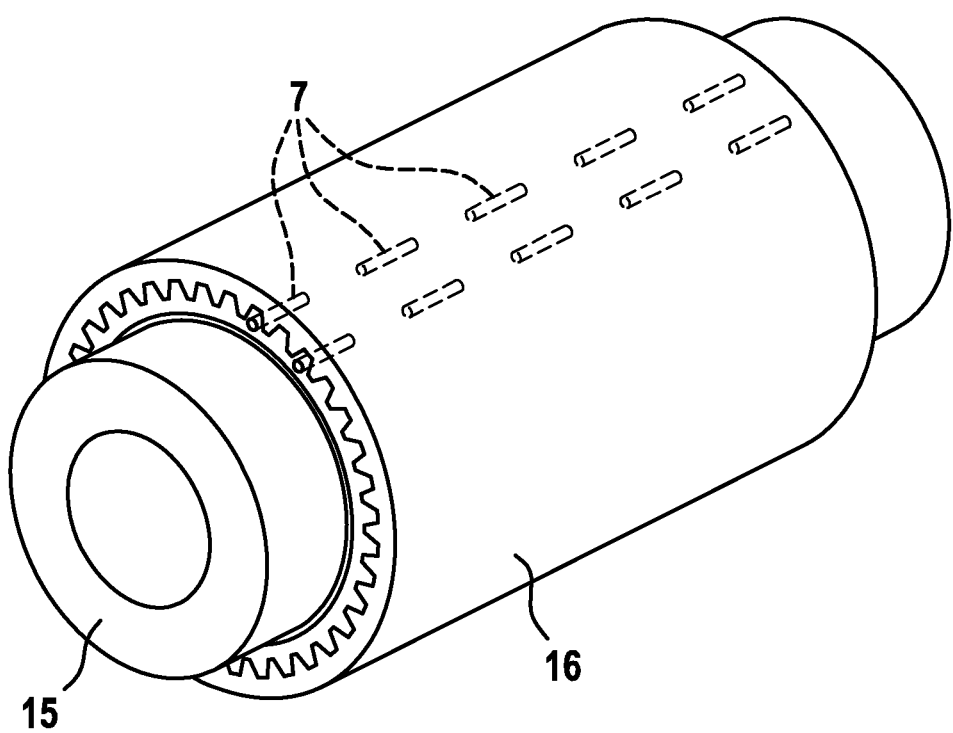
Figure 4:
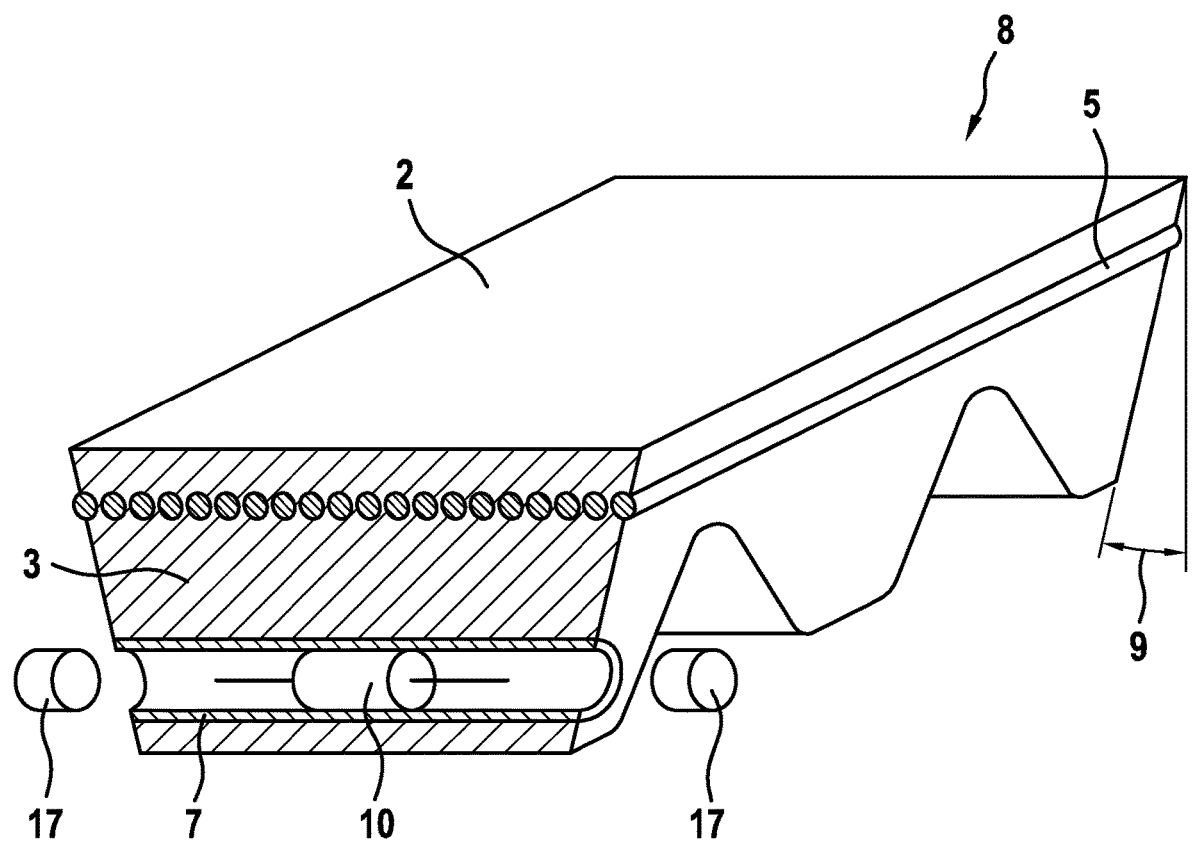

The invention is to be explained in more detail by means of an exemplary embodiment in the form of a drive belt, in which:

FIG. 1 shows a section of a drive belt according to the invention designed as a wide V-belt, FIG. 2 shows a segment of the wound blank on the belt building drum with a surrounding profiled heating sleeve at a point in time during production before vulcanization, FIG. 3 shows, in principle, the state of the drive belt blank while it is still on the belt building drum after vulcanization, in a perspective overall view, FIG. 4 shows a section of another embodiment of a drive belt according to the invention designed as a wide V-belt.

FIG. 1 shows a section of a drive belt 1, designed as a wide V-belt, made from a rubber blend, on which the flank angles, i.e. the bevels of the sides, are not yet present but which is otherwise fully vulcanized and finished. FIG. 4 shows a drive belt 8 of the same kind, on which the flank angle 9 has already been formed, e.g. by a grinding process.

The wide V-belt has a top ply 2 and a base 4 provided with the toothed profile 3. In the region between the top ply and the base it is possible to see cords 5 as reinforcing elements and tension members, which are embedded in the rubber matrix and extend in the longitudinal direction 6 of the belt.

The drive belt has two elongate tubular receptacles 7, which are embedded in the elastomeric rubber material and in the internal cavity of which electronic components 10 are arranged. For greater clarity, an electronic component 10 of this kind is illustrated once again in isolation at the bottom right next to the drive belt section.

Here, the electronic component 10 comprises a temperature sensor, an acceleration sensor and a strain sensor as well as a central processor and radio communication unit and two antennas 11. Here, the sensors and the processor unit are not illustrated specifically and comprise conventional electronic elements.

With the aid of such sensors, the temperature loading of the drive belt, the running speed, the tensile force and the irreversible strains which occur during operation can be measured and can be read out in a contactless manner by means of the radio communication unit and the antennas. In this way, it is possible, in the context of a damage accumulation analysis for example, to estimate the loads on the belt and the corresponding service life thereof. This enables the belt to be replaced at the optimum point in time.

Here, the tubular receptacles 7 are small tubes with a diameter of about 2.5 to 5 mm and are embedded in the elastomer material in such a way that their longitudinal axis or the direction of their greatest extent 12 is oriented transversely to the main bending direction 13 of the drive belt, which generally means, e.g. in the case of the endless drive belt under consideration here, that they are also formed transversely to the running direction or longitudinal direction 6.

The electronic components within the cavity are surrounded and fixed by a curing synthetic casting resin.

In the center, FIG. 2 shows a segment of a wound blank 14 having an inserted tubular receptacle 7, in this case likewise a small tube, wherein the wound blank is laid on the assembly drum/belt building drum 15 and a surrounding heating sleeve 16 having the profile negative has already been moved up for vulcanization. While in this case all the parts, that is to say also the assembly drum and the heating sleeve, are illustrated in the form of sections, FIG. 3 shows, in principle, the state after vulcanization in a perspective overall view, i.e. after the heating sleeve 16 has been fed in and the blank has been molded and fully vulcanized to give the finished loop. The tubular receptacles 7 inserted in segments can also be seen here. Matched to the length of these "individual small tubes", the corresponding wide V-belts can now be produced in the form of sections.

After the cut individual belts have been vulcanized and turned inside out, the state illustrated in FIGS. 1 and 4 is then obtained.

Here, FIG. 4 shows a design in which the tubular receptacle 7 is provided at the ends with closure plugs 17 after the insertion of the electronic component 10.

LIST OF REFERENCE SIGNS (Part of the Description)
 1 Drive belt
 2 Top ply
 3 Toothed profile
 4 Base
 5 Cord/tension member
 6 Longitudinal direction of the belt
 7 Tubular receptacle
 8 Drive belt
 9 Flank angle
 10 Electronic component
 11 Antenna
 12 Direction of the greatest extent of the tubular receptacle
 13 Main bending direction of the drive belt
 14 Wound blank
 15 Belt building drum
 16 Heating sleeve
 17 Closure plug

The invention claimed is:

1. A band designed running around rollers or pulleys and made of an elastomer material, the band comprising:
    embedded reinforcing elements or tension members extending in a longitudinal direction;
    one or more elongate tubular receptacles embedded in the elastomer material prior to vulcanization;
    a plurality of electronic components positioned within the one or more tubular receptacles and provided with closure plugs after vulcanization;
    wherein the tubular receptacles have a longitudinal axis oriented substantially transversely to the longitudinal direction of the band;
    each electronic component comprises a sensor, a processor, a radio and an antenna.

2. The band as claimed in claim 1, wherein the electronic components are surrounded and fixed within a cavity by a synthetic casting resin.

3. The band as claimed in claim 2, wherein the electronic components are surrounded within the cavity by shock absorbing material and the tubular receptacle is provided at the end/s with a closure or plug.

4. The band as claimed in claim 1, wherein the electronic components are surrounded within a cavity by thermally conductive material.

5. The band as claimed in claim 1, wherein the tubular receptacle is a plastic tube comprised of polyamide (PA) or polyphenylene sulfide (PPS).

6. The band as claimed in claim 1, wherein the tubular receptacle is connected to a longitudinal side of the band and a cavity is accessible from there.

7. The band as claimed in claim 1, where the band is a toothed belt or wide V-belt.

8. The band as claimed in claim 1, wherein the plurality of electronic components comprise a plurality of sensors.

9. The band as claimed in claim 1, the sensor comprises a temperature sensor, an acceleration sensor, and a strain sensor.

10. The band as claimed in claim 9, the electronic components configured to read out a running speed and a tensile force during operation of the band.

11. The band as claimed in claim 10, the one or more elongate tubular receptacles having a diameter of about 2.5 to 5.0 millimeter (mm).

12. The band as claimed in claim 1, further comprising a top ply formed over the embedded reinforcing elements and a toothed profile adjacent the embedded reinforcing elements and opposite the top ply and a first electronic component is embedded within the top ply and a second electronic component is embedded within the toothed profile.

13. The band of claim 9, the tubular receptacles extend completely through the band transversely to the longitudinal direction of the band.

\* \* \* \* \*